US012448484B2

(12) United States Patent
Laskowski et al.

(10) Patent No.: US 12,448,484 B2
(45) Date of Patent: Oct. 21, 2025

(54) PHOSPHATE-CONTAINING COPOLYMERS FOR VIRULENCE SUPPRESSION

(71) Applicant: 3M INNOVATIVE PROPERTIES COMPANY, St. Paul, MN (US)

(72) Inventors: Carl A. Laskowski, Minneapolis, MN (US); Timothy M. Gillard, St. Paul, MN (US); Ranjani V. Parthasarathy, Woodbury, MN (US); Hannah C. Cohen, St. Paul, MN (US); Max A. Kruziki, New Brighton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 544 days.

(21) Appl. No.: 18/004,910

(22) PCT Filed: Jun. 14, 2021

(86) PCT No.: PCT/IB2021/055220
§ 371 (c)(1),
(2) Date: Jan. 10, 2023

(87) PCT Pub. No.: WO2022/013642
PCT Pub. Date: Jan. 20, 2022

(65) Prior Publication Data
US 2023/0357500 A1 Nov. 9, 2023

Related U.S. Application Data

(60) Provisional application No. 62/705,806, filed on Jul. 16, 2020.

(51) Int. Cl.
*C08G 65/327* (2006.01)
*A61K 31/80* (2006.01)
*A61L 27/34* (2006.01)
*A61L 27/54* (2006.01)
*A61L 29/08* (2006.01)
*A61L 29/16* (2006.01)
*A61L 31/10* (2006.01)
*A61L 31/16* (2006.01)
*A61P 31/04* (2006.01)
*C08G 65/08* (2006.01)
*C08G 65/22* (2006.01)
*C08G 65/335* (2006.01)
*C08G 81/00* (2006.01)
*C08L 71/02* (2006.01)

(52) U.S. Cl.
CPC ............ *C08G 65/327* (2013.01); *A61K 31/80* (2013.01); *C08G 65/08* (2013.01); *C08G 81/00* (2013.01); *C08G 2650/58* (2013.01)

(58) Field of Classification Search
None
See application file for complete search history.

(56) References Cited

U.S. PATENT DOCUMENTS

| 6,551,580 | B2 | 4/2003 | Shalaby |
| 7,964,217 | B2 | 6/2011 | Harris |
| 8,636,993 | B2 | 1/2014 | Scholz et al. |
| 9,937,199 | B2 | 4/2018 | Alverdy |
| 10,471,036 | B2 | 11/2019 | Scholz et al. |
| 2008/0317702 | A1 | 12/2008 | Edgington et al. |
| 2011/0177012 | A1 | 7/2011 | Fütterer et al. |
| 2011/0218226 | A1 | 9/2011 | Shoham |
| 2012/0157529 | A1 | 6/2012 | Kull et al. |
| 2019/0194250 | A1 | 6/2019 | Colak Atan et al. |
| 2019/0247423 | A1* | 8/2019 | Alverdy ............... A61K 9/0095 |
| 2019/0285523 | A1 | 9/2019 | Rasmussen et al. |

FOREIGN PATENT DOCUMENTS

| WO | WO-2009078978 A2 * | 6/2009 | ............... A61P 9/04 |
| WO | 2017024282 A1 | 2/2017 | |
| WO | 2018048696 A1 | 3/2018 | |
| WO | 2018064536 A1 | 4/2018 | |
| WO | 2019209844 A1 | 10/2019 | |
| WO | 2020128732 A2 | 6/2020 | |

OTHER PUBLICATIONS

Kaluzynski et al., "Poly(ethylene glycol)-b-Phosphorylated Polyglycidols as CaCO3 Crystal Growth Modifiers. II. Macromolecular Architecture versus the Crystal Size and Shape and Crystallization Inhibition," Journal of Polymer Science: Part A: Polymer Chemistry, vol. 45, pp. 90-98 (2007). (Year: 2007).*
Halacheva, "Poly(glycidol)-Based Analogues to Pluronic Block Copolymers. Synthesis and Aqueous Solution Properties", Oct. 2006, vol. 39, No. 20, pp. 6845-6852.
International Search Report received for PCT International Application No. PCT/IB2021/055220, mailed on Oct. 22, 2021, 5 pages.
Mao, "De Novo Synthesis of Phosphorylated Triblock Copolymers with Pathogen Virulence-Suppressing Properties That Prevent Infection-Related Mortality", 2017, ACS Biomaterials Science & Engineering, vol. 3, No. 9, pp. 2076-2085.
Schomer, "Water-Soluble "Poly (propylene oxide)" by Random Copolymerization of Propylene Oxide with a Protected Glycidol Monomer", Macromolecules, Mar. 2012, vol. 45, pp. 3039-3046.

(Continued)

Primary Examiner — Ha S Nguyen
(74) Attorney, Agent, or Firm — Jean A. Lown

(57) ABSTRACT

Phosphate-containing copolymers, medical compositions containing the phosphate-containing copolymers, and methods of suppressing microbial virulence are provided. By suppressing virulence, administration and/or application of the medical compositions can be used to prevent, mitigate, or treat a microbial infection. The phosphate-containing copolymers are prepared by phosphorylating either a random copolymer or a random copolymeric block that contains monomeric units of propylene oxide and glycidol.

20 Claims, No Drawings

(56) References Cited

OTHER PUBLICATIONS

Stiriba, "Hyperbranched Molecular Nanocapsules: Comparison of the Hyperbranched Architecture with the Perfect Linear Analogue", 2002, Journal of the American Chemical Society (JACS), vol. 124, No. 33, pp. 9698-9699.

Wang, "Synthesis and Thermoresponsive Behaviours of Biodegradable Pluronic Analogs", Jan. 2009, Journal of Polymer Science Part A: Polymer Chemistry, vol. 47, No. 22, pp. 6168-6179.

Zaborin, "Phosphate-Containing Polyethylene Glycol Polymers Prevent Lethal Sepsis by Multidrug-Resistant Pathogens", Nov. 25, 2013, Antimicrobial Agents and Chemotherapy, vol. 58, No. 2, pp. 966-977.

* cited by examiner

PHOSPHATE-CONTAINING COPOLYMERS FOR VIRULENCE SUPPRESSION

CROSS REFERENCE TO RELATED APPLICATIONS

This application is a national stage filing under 35 U.S.C. 371 of PCT/IB2021/055220, filed Jun. 14, 2021, which claims the benefit of Provisional Patent Application No. 62/705,806, filed Jul. 16, 2020, the disclosure of which is incorporated by reference in its/their entirety herein.

BACKGROUND

Many known treatments of pathogens result in the destruction of all microbes that may be present, even beneficial microbes. Further, because of these treatment methods, there is growing concern about antibiotic resistance that will increase risks to patients, particularly to those undergoing surgical procedures. Newer approaches have been directed toward suppressing the virulence of the pathogen that causes the infection rather than destroying all microbes.

New methods are needed to prevent the expression of one or more virulence factors while preserving colonization of beneficial bacteria. That is, new methods are needed that do not destroy all the beneficial bacteria in the process of preventing the harm done by pathogens. The importance of phosphate-containing compositions for virulence suppression has been demonstrated in recent references, such as in U.S. Patent Publication 2019/0247423 (Alverdy et al.).

SUMMARY

Phosphate-containing copolymers, medical compositions containing the phosphate-containing copolymers, and methods of suppressing microbial virulence are provided. By suppressing virulence, administration and/or application of the medical compositions can be used to prevent, mitigate, or treat a microbial infection. More specifically, the medical compositions include a phosphate-containing copolymer. The phosphate-containing copolymers can suppress the expression of various virulence factors without destroying all microbes that may be present.

In a first aspect, a phosphate-containing copolymer is provided. The phosphate-containing copolymer comprises a first copolymeric unit that contains (a) monomeric units of Formula (I), (b) monomeric units of Formula (II) or a salt thereof, and (c) optional monomeric units of Formula (III).

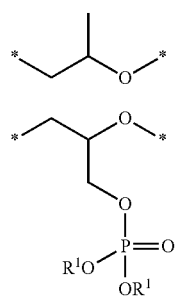

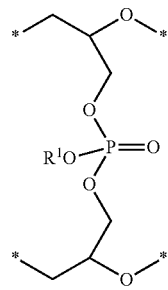

In these formulas, group $R^1$ is hydrogen, alkyl, aryl, alkaryl, or aralkyl. The variable x is equal to the mole percent of the monomeric unit of Formula (I) in the first copolymeric unit, the variable y is equal to the mole percent of the monomeric unit of Formula (II) in the first copolymeric unit, and the variable z is equal to the mole percent of the monomeric units of Formula (III) in the first copolymeric unit. The sum (x+y+2z) is at least 90 mole percent based on total moles of monomeric units in the first copolymeric unit. The quotient $100[(y+2z)\div(x+y+2z)]$ is in a range of 3.5 to 30 for the first copolymeric unit and is equal to the percentage of phosphate-containing monomeric units in the first copolymeric unit. Each asterisk (*) in the above formulas denotes the location of a connection site to another monomeric unit or to a terminal group.

In a second aspect, a medical composition is provided that is suitable for administration and/or application for preventing, mitigating, or treating a microbial infection. The medical composition includes a phosphate-containing copolymer as described in the first aspect.

In a third aspect, a method of suppressing microbial virulence is provided. The method includes administrating and/or applying a medical composition comprising a phosphate-containing copolymer according to the first aspect.

As used herein, "alkyl" refers to a monovalent group that is a radical of an alkane and includes groups that are linear, branched, cyclic, bicyclic, or a combination thereof. Unless otherwise indicated, the alkyl groups typically contain from 1 to 20 carbon atoms. In some embodiments, the alkyl groups contain 1 to 10 carbon atoms, 2 to 10 carbon atoms, 1 to 6 carbon atoms, 2 to 6 carbon atoms, 1 to 4 carbon atoms, or 2 to 4 carbon atoms. Cyclic alkyl groups and branched alkyl groups have at least three carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "aryl" refers to a monovalent group that is aromatic and, optionally but usually, carbocyclic. The aryl has at least one aromatic ring. Any additional rings can be unsaturated, partially saturated, saturated, or aromatic. Optionally, the aromatic ring can have one or more additional carbocyclic rings that are fused to or connected to the aromatic ring. Unless otherwise indicated, the aryl groups typically contain from 6 to 20 carbon atoms. In some embodiments, the aryl groups contain 6 to 18, 6 to 16, 6 to 12, or 6 to 10 carbon atoms. Examples of an aryl group include phenyl, naphthyl, biphenyl, phenanthryl, and anthracyl.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms, and an aryl portion often has 6 to 20 carbon atoms, 6 to 18 carbon atoms, 6 to 16 carbon atoms, 6 to 12 carbon atoms, or 6 to 10 carbon atoms.

As used herein, the term "phosphate group" refers to a group of formula —O—P(=O)(OR$^1$)$_2$ that is bonded to a carbon atom and where R$^1$ is hydrogen, alkyl, aryl, aralkyl, or alkaryl. The term includes phosphoric acid groups (where at least one R$^1$ group is hydrogen), salts of phosphoric acid groups, and phosphoric acid ester groups (also known as phosphate ester groups, where both R$^1$ groups are selected from alkyl, aryl, aralkyl, and alkaryl). The phosphate group can be interchangeably written as —O—P(=O)(OR$^1$)$_2$ or —O—PO(OR)$_2$. Alternatively, the phosphate group can be written for the sake of brevity as "N".

The term "monomeric unit" refers to a polymerized product of a monomer. For example, the monomeric unit associated with the monomer methyl acrylate (CH$_2$=CH—(CO)—O—CH$_3$) is

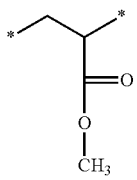

where each asterisk (*) shows a location where the monomeric unit is attached to another monomeric unit or a terminal group of a polymeric material.

The term "copolymeric unit" refers to a polymerized product of a monomer composition. The copolymer contains one or more copolymeric units. For example, a random copolymer contains a single copolymeric unit and a block copolymer contains multiple copolymeric units. For block copolymers, each copolymeric unit may be defined as a "block."

The term "random copolymer" refers to the polymerized product of a reaction mixture containing more than one type of monomer. The monomers can be statistically random if all the monomers polymerize at about the same rate or the copolymer can be gradient-like if the monomers polymerize at different rates.

The term "polymer" and variations thereof are used to refer to homopolymers, copolymers, terpolymers, and the like. The word "copolymer" and variations thereof are used to refer to polymers that contain more than one type of monomeric unit.

The term "virulence" refers to a pathogen's ability to infect or damage a host such as a mammal.

The term "virulence suppression" and "suppression of microbial virulence" or similar expressions refer to suppressing or inhibiting the synthesis and/or expression of one or more virulence factors.

The term "virulence factor" refers to molecules produced by microbes that enable them to infect a host such as a mammal. The virulence factors of bacteria can be small molecules, proteins, or biofilms (e.g., a slimy buildup of bacteria on a surface). The virulence factors are typically secreted by a microbe to promote colonization and/or adhesion to a host (e.g., resulting in biofilm formation), to evade the immune response of the host, or to obtain nutrients from the host.

The terms "comprise", "contain", "include", and variations thereof do not have a limiting meaning where these terms appear in the description and claims Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase and is limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether they materially affect the activity or action of the listed elements. Any of the elements or combinations of elements that are recited in this specification in open-ended language (e.g., comprise, include, contain, and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful and is not intended to exclude other claims from the scope of the disclosure.

In this application, terms such as "a", "an", and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or both. For example, the expression A and/or B means A alone, B alone, or both A and B.

Also, the recitations of numerical ranges by endpoints include all numbers subsumed within that range as well as the endpoints (e.g., 1 to 5 includes 1, 1.5, 2, 2.75, 3, 3.80, 4, 5, etc.) and any sub-ranges (e.g., 1 to 5 includes 1 to 4, 1 to 3, 2 to 4, etc.).

DETAILED DESCRIPTION

The importance of the amount of available phosphate in the proximity of bacteria has recently been demonstrated by various researchers. The virulence activity of certain bacteria such as *Pseudomonas aeruginosa* can increase if phosphate in their environment is scarce but can decrease if phosphate is abundant. For example, if a mammalian gut experiences a physiologic stress such as surgery, phosphate can become depleted. This depletion triggers colonized bacteria to express certain virulence factors. Hence, medical compositions that can provide a phosphate supply to the gut are critically needed. One approach to providing the phosphate supply is to administer a medical composition that can coat the gut and prevent the bacteria from turning virulent.

Similarly, medical compositions that can supplement phosphate in a wound environment or surgical site would also be useful in keeping bacteria such as *Pseudomonas aeruginosa* from turning virulent.

Phosphate-containing copolymers, medical compositions containing the phosphate-containing copolymers, and methods of suppressing microbial virulence are provided. Microbial virulence is suppressed by reducing or inhibiting the formation and/or expression of one or more virulence factors, which are the harmful products that can lead to microbial infections. That is, the medical compositions can prevent, mitigate, or treat microbial infections. The medical compositions typically do not prevent continued colonization of microbes such as those that are helpful to the mammal Phosphate-Containing Copolymers The phosphate-containing copolymers are prepared by phosphorylating a precursor copolymer that contains monomeric units of propylene oxide and glycidol. The precursor copolymer is either a random copolymer precursor or a block copolymer that contains a random copolymeric block.

The phosphate-containing copolymer comprises a first copolymeric unit that contains (a) monomeric units of Formula (I), (b) monomeric units of Formula (II) or a salt thereof, and (c) optional monomeric units of Formula (III).

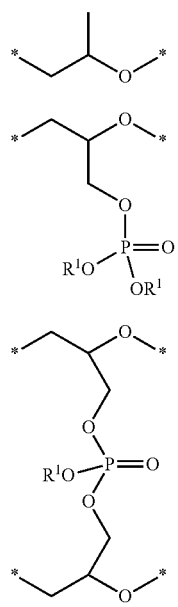

In these formulas, the group $R^1$ is independently hydrogen, alkyl, aryl, alkaryl, or aralkyl. The first copolymeric unit contains x mole percent monomeric units of Formula (I), y mole percent monomeric units of Formula (II), and z mole percent monomeric units of Formula (III) based on total moles of monomeric units in the first copolymeric unit. The phosphate-containing copolymer can include one or more first copolymeric units. Further, the phosphate-containing copolymer can optionally include one or more second polymeric units that are different than the first copolymeric unit.

Each $R^1$ is independently hydrogen, alkyl, aryl, aralkyl, or alkaryl Depending on the pH, the phosphate group can be in the form of a salt. In many embodiments, each $R^1$ group is independently hydrogen (or a salt thereof) or alkyl. Suitable alkyl groups contain 1 to 10 carbon atoms, 1 to 6 carbon atoms, 1 to 4 carbon atoms, or 1 to 3 carbon atoms. Although any suitable aryl, aralkyl, and alkaryl group can be used, they are often respectively phenyl, benzyl, or tolyl. Any anionic group in the salt of the phosphonic acid group is charge balanced with a cationic group such as a cation of an alkaline metal or alkaline earth metal or a quaternary ammonium ion. The salt can be formed by treating the phosphonic acid group with a base.

The first copolymeric unit contains monomeric units of Formula (I) and Formula (II). In some embodiments, the first copolymeric unit further contains monomeric units of Formula (III). If the optional monomeric units of Formula (III) are present, the first copolymeric unit is crosslinked. At least 90 mole percent of all the monomeric units within the first copolymeric unit are of Formula (I), Formula (II), or Formula (III). Stated differently, the sum (x+y+2z) is at least 90 mole percent based on total moles of monomeric units in the first copolymeric unit. The variable x refers to the mole percent of monomeric units of Formula (I), the variable y refers to the mole percent of monomeric units of Formula (II), and the variable z refers to the mole percent of monomeric units of Formula (III) based on the total moles of monomeric units within the first copolymeric unit. In some embodiments, the sum (x+y+2z) is at least 92 mole percent, at least 94 mole percent, at least 95 mole percent, at least 96 mole percent, at least 98 mole percent, at least 99 mole percent, at least 99.5 mole percent, at least 99.9 mole percent, or 100 mole percent based on the total moles of monomeric units within the first copolymeric unit.

Stated differently, no greater than 10 mole percent (e.g., 0 to 10 mole percent) of the monomeric units present in the first copolymeric unit are outside the scope of the monomeric units of Formula (I), Formula (II), and Formula (III). This amount is often no greater than 8 mole percent, no greater than 6 mole percent, no greater than 5 mole percent, no greater than 4 mole percent, no greater than 3 mole percent, no greater than 2 mole percent, no greater than 1 mole percent, no greater than 0.5 mole percent, or no greater than 0.1 mole percent based on the total moles of monomeric units within the first copolymeric unit. In many embodiments, there are no other monomeric units other than those of Formulas (I), (II), and (III) in the first copolymeric unit.

The monomeric units of Formula (III) result from crosslinking of the first copolymeric unit. Any desired extent of crosslinking can be used. Crosslinking can be used to alter the solubility of the phosphate-containing copolymer in water even when the copolymer contains large amounts of phosphate-containing monomeric units. The mole percent of the crosslinked monomeric unit of Formula (III) relative to all the phosphate-containing monomeric units of Formulas (II) and (III), which is equal to 100[z÷(y+z)], can be in a range of 0 to 95 mole percent. The mole percent amount can be equal to 0, at least 0.1, at least 0.5, at least 1, at least 2, at least 5, at least 10, at least 20, at least 30, at least 40, at least 50, at least 60, or at least 70 and up to 95 or higher, up to 90, up to 80, up to 70, up to 60, up to 50, or up to 40.

The quotient 100[(y+2z)÷(x+y+2z)] is in a range of 3.5 to 30 mole percent or 5 to 30 mole percent. The quotient is equal to the mole percent of phosphate-containing monomeric units based on the total moles of monomeric units in the first copolymeric unit. This amount can be at least 3.5 mole percent, at least 4 mole percent, at least 5 mole percent, at least 6, at least 8, at least mole percent, or at least 15 mole percent and up to 30 mole percent, up to 25 mole percent, up to 20 mole percent, up to 15 mole percent, or up to 10 mole percent.

The first copolymeric unit is typically prepared starting from (1) propylene oxide and (2) protected glycidyl ether such as, for example, ethoxyethyl-glycidyl ether (EEGE), tetrahydrofuranyl glycidyl ether, and tetrahydropyranyl glycidyl ether. The first intermediate is a copolymer having monomeric units of Formula (I)

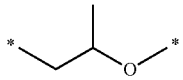
(I)

derived from propylene oxide plus monomeric units of Formula (V)

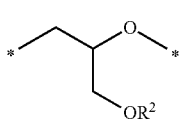
(V)

derived from a protected glycidyl ether where $R^2$ is the protection group. $R^2$ is often a group of formula —$CHR^3$—O—$R^4$ where each $R^3$ and $R^4$ is independently an alkyl having 1 to 4 carbon atoms or where $R^3$ and $R^4$ combine to form a heterocyclic ring having an oxygen heteroatom. The heterocyclic ring often has 5 or 6 ring members.

In some embodiments, the protected glycidyl ether is ethoxyethyl-glycidyl ether (EEGE), which can be prepared as described by Frey et. al. in, *J. Am. Chem. Soc.*, 2002, 124, 9698. The monomeric units of Formula (V) are of Formula (V-1).

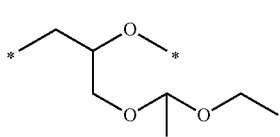
(V-1)

The first intermediate having monomeric units of Formula (I) and (V) is treated with an acid such as hydrochloric acid to form a second intermediate copolymer, which can be referred to as the precursor copolymer, with the monomeric units of Formula (V) converted to monomeric units of Formula (VI), which is a monomeric unit of ring-opened (or polymerized)glycidol.

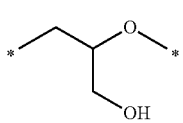
(VI)

The monomeric units of Formula (VI) in the precursor copolymer can be reacted with phosphorous oxychloride and then hydrolyzed to form the first copolymeric unit with monomeric units containing a phosphate group. A molar excess of the phosphorous oxychloride relative to the hydroxy groups present in the precursor is often used to prepare a linear first copolymeric unit. For example, the molar excess can be at least 2, at least 3, at least 5, or at least 10. With a molar excess of phosphorous oxychloride relative to the hydroxy groups, the resulting first polymeric unit is usually linear and has monomeric units of Formula (II).

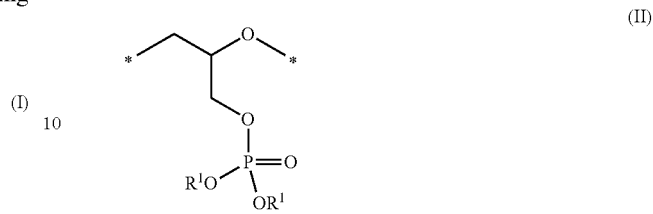
(II)

The monomeric units of Formula (I) remain unchanged through all the reactions involved in the formation of the first copolymeric unit.

The first copolymer unit can be a crosslinked rather than linear. The extent of crosslinking can be controlled by the molar ratio of phosphorous oxychloride added relative to the hydroxy groups in the precursor copolymer (relative to the monomeric units of Formula (VI)). The lower the ratio, the greater the extent of crosslinking. To introduce a relatively low amount of crosslinking, the molar ratio is often selected to be 1 or slightly lower than 1 such as in a range of about 0.8 to 1. The third monomeric units of Formula (III)

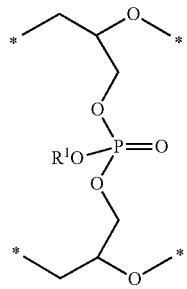
(III)

are present in the crosslinked first copolymeric units but are typically absent in the linear first copolymeric units. The third monomeric units of Formula (III) result from the condensation of two monomeric units of Formula (II) within the same or different first copolymeric units.

The first copolymeric unit is a random copolymeric unit. The resulting first copolymeric unit is classified as being random even though the rate of polymerization of the monomers propylene oxide and ethoxyethyl-glycidyl ether that are included in the initial polymerization reaction often polymerize at different rates. The rate of polymerization for both propylene oxide and ethoxyethyl-glycidyl ether may be impacted by the method of polymerization (e.g. monomer activated polymerization processes, traditional anionic polymerization processes, or double metal cyanide-catalyzed polymerization processes). Both monomers are present in the initial reaction mixture used to form the first intermediate copolymer.

In some embodiments, the phosphate-containing copolymer contains a single first copolymeric unit. That is, all the monomeric units of the phosphate-containing copolymer are within the first copolymeric unit. The phosphate-containing copolymer is a random copolymer.

In contrast to random copolymers, the phosphate-containing copolymer may be a block copolymer that includes a first block that is the first copolymeric unit plus at least one second block that is different than the first copolymeric unit. Typically, the second block is free of phosphate-containing monomeric units. For example, the second block can be a polyethylene oxide block, a polypropylene oxide block, or a combination thereof (e.g., a Pluronic block copolymeric unit). The block copolymers are usually diblock or triblock copolymers.

Some block copolymers are triblocks that includes (a) two endblocks that are each a first copolymeric unit and (b) a midblock that is free of phosphate groups and that comprises poly(ethylene oxide), poly(propylene oxide), or a combination thereof. In some embodiments, the midblock is a Pluronic copolymeric unit of Formula (IV).

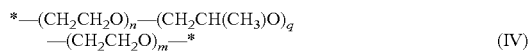

In Formula (IV), the variables n, q, and m are each an integer that is equal to at least 1. Each asterisk (*) denotes a connection site to another monomeric unit or to a terminal group. The variable q is often at least 1, at least 2, at least 3, at least 5, at least 10, at least 20, at least 30, at least 40, at least 50, or at least 60 and up to 90, up to 86, up to 85, up to 80, up to 70, up to 60, up to 50, up to 40, or up to 30. Each m and n is independently at least 1, at least 2, at least 5, at least 10, at least 20, at least 30, at least 40, at least 50, at least 60, at least 70, or at least 80 and up to 125, up to 120, up to 110, up to 100, up to 90, up to 80, up to 70, up to 60, up to 50, up to 40, up to 30, or up to 20. The sum n+m can range from 2 to 250.

Some triblock copolymers contain 20 to 70 weight percent midblock and 30 to 80 weight percent endblocks with each endblock containing a first copolymeric unit. The weight percent amount is based on a total weight of the triblock copolymer. The amount of the midblock can be at least 20 weight percent, at least 25 weight percent, at least 30 weight percent, at least 35 weight percent, at least 40 weight percent, at least 45 weight percent, or at least 50 weight percent and up to 70 weight percent, up to 65 weight percent, up to 60 weight percent, up to 55 weight percent, up to 50 weight percent, up to 45 weight percent, or up to 40 weight percent. The balance of the weight is typically attributable to the endblocks.

The phosphate-containing copolymer typically contains 0.8 to 6.5 mmoles phosphate per gram of the copolymer. The amount can be at least 0.8, at least 0.90, at least 1.0, at least 1.1, at least 1.2, at least 1.5, at least 1.8, at least 2, at least 2.2, at least 2.5, at least 2.7, or at least 3.0 and up to 6.5, up to 6.2, up to 6.0, up to 5.8, up to 5.5, up to 5.2, up to 5.0, up to 4.7, up to 4.5, up to 4.2, up to 4.0, up to 3.7, up to 3.5, up to 3.2, or up to 3.0 mmoles phosphate per gram of the phosphate-containing copolymer. In some examples, the phosphate-containing copolymer contains 1 to 6, 1 to 5, 1 to 4.5, 1 to 4, or 1 to 3.5 mmoles phosphate per gram of the phosphate-containing copolymer. The amount can often be determined as described in the example section based on the number of hydroxy groups in the precursor with the presumption that all of the hydroxy groups are reacted with a molar excess of the phosphorous oxychloride relative to the hydroxy groups. Alternatively, the amount can be determined using an analytical method known to those skilled in the art such as, for example, $P^{31}$-NMR or phosphorous elemental analysis (e.g., analysis using inductively coupled plasma spectroscopy or ion chromatography).

The number average molecular weight of a non-crosslinked phosphate-containing copolymer is often in a range of 6,000 to 80,000 Daltons. The number average molecular weight is at least 6,000 Daltons, at least at least 8,000 Daltons, at least 10,000 Daltons, at least 15,000 Daltons, at least 20,000 Daltons, at least 25,000 Daltons, at least 30,000 Daltons, at least 35,000 Daltons, at least 40,000 Daltons, at least 45,000 Daltons, or at least 50,000 Daltons and up to 80,000 Daltons, up to 75,000 Daltons, up to 70,000 Daltons, up to 65,000 Daltons, up to 60,000 Daltons, up to 55,000 Daltons, up to 50,000 Daltons, up to 45,000 Daltons, or up to 40,000 Daltons. In some embodiments, random copolymers have a number average molecular weight up to about 40,000 Daltons while triblock copolymer have a number average molecular weight up to about 80,000 Daltons. The number average molecular weight is typically determined using gel permeation chromatography with polystyrene standards as described in the Example section. Alternatively, the weight average molecular weight can be determined on the final phosphate-containing polymer using methods known to those skilled in the art, include H-NMR characterization of the end groups or backbone hydrogen analysis, or using an acid-base titration.

The phosphate-containing copolymer is often not miscible with water and/or has a solubility in water up to about 200 milligrams per milliliter at 30 degrees Celsius. The miscibility in water can be controlled, if desired, by crosslinking through the groups of Formula (III). For use in some medical compositions, low solubility in water may be desirable because the phosphate-containing copolymer is more likely to remain at the desired location, such as on tissue, for longer periods of time.

Medical Compositions

In another aspect, a medical composition is provided that includes any of the phosphate-containing copolymers that are described above. One or a plurality of different phosphate-containing copolymers can be used in the medical compositions. Two or more different phosphate-containing polymers can be blended together within the medical composition to suppress virulence of different types of pathogens and/or to suppress different virulence factors expressed by a single type of pathogen. For example, a first phosphate-containing copolymer that is particularly effective at suppressing the virulence of a first pathogen can be combined with a second phosphate-containing polymer that is particularly effective at suppressing the virulence of a second pathogen. The plurality of different phosphate-containing polymers can be blended together in any desired ratio.

The medical composition often contains 0.1 to 100 weight percent of the phosphate-containing copolymer based on a total weight of the medical composition. The amount can be at least 0.1 weight percent, at least 0.5 weight percent, at least 1 weight percent, at least 2 weight percent, at least 5 weight percent, at least 10 weight percent, at least 20 weight percent, at least 30 weight percent, at least 40 weight percent, or at least 50 weight percent and up to 100 weight percent, up to 90 weight percent, up to 80 weight percent, up to 70 weight percent, up to 60 weight percent, or up to 50 weight percent.

The phosphate-containing copolymer can be purified, if desired, using any method that is suitable for purification of polymeric materials included in a medical composition. For example, the phosphate-containing copolymer can be purified by filtration.

The medical composition can optionally further include other components that facilitate delivery of the medical composition for preventing, mitigating, or treating a microbial infection. The optional components are selected to be therapeutically acceptable, which means that the optional components do not interfere with the effectiveness of the phosphate-containing copolymer and are not toxic to the mammal being treated. The additional components are typically selected so that the medical composition does not substantially reduce non-pathogenic and/or normally helpful microbes that may be present. The log reduction of microbes is often less than 1.

The medical compositions can be administered and/or applied in any desired formulation such as a spray, lotion, ointment, gel, solution, emulsion, dispersion, foam, coating, paste, powder, tablet, capsule, or the like. The formulation used is dependent on the location of the infection or potential infection and on the desired delivery method.

For some applications, it is desirable that the medical composition remain in a location where is it administered and/or applied. Such medical compositions are usually formulated to have a suitably high viscosity and/or to include a hydrophobic component that will enhance retention of the medical composition at the application location. These formulations can be, for example, an emulsion, ointment, gel, or lotion. Emulsions can be oil-in-water or water-in-oil.

The medical compositions that include components such as, for example, water, organic solvents, hydrophobic components (e.g., petrolatum and oils), hydrophilic components (glycerin and various ether and/or polyether compounds), silicones, surfactants (i.e., anionic, cationic, non-ionic, amphoteric, and ampholytic surfactants), carbohydrates, emulsifiers, water, organic solvents (e.g., alcohols and polyols), stabilizers (e.g., polymers), fillers (e.g., organic materials such as polymeric particles and inorganic materials including ceramic particles, silica particles, clay particles, and glass particles), emollients/moisturizers, humectants, tonicity adjusting agents, chelating agents, anti-inflammatory agents, gelling agents, preservatives, pH adjusting agents, viscosity builders, time-release agents, dyes, fragrances or oils, and the like.

The medical compositions optionally can be sterilized by any suitable method that will not negatively impact its efficacy. For example, if desired, the medical composition can be treated with ethylene oxide.

Method of Administering and/or Applying the Medical Composition

In another aspect, a method of suppressing microbial virulence is provided. The microbial virulence is typically suppressed by reducing or inhibiting the synthesis and/or expression of one or more virulence factors by the microbe. By suppressing the synthesis and/or expression of one or more virulence factors, a microbial infection can be prevented, mitigated, or treated.

The method includes administrating and/or applying a medical composition comprising a phosphate-containing copolymer having at least 0.8 mmoles phosphate per gram of the phosphate-containing copolymer, wherein the phosphate-containing copolymer is any of those described above.

Any suitable method of administering and/or applying the medical composition can be used. For example, the medical composition can be applied to skin, mucosa, tissue (both exterior and interior surfaces of tissue), a wound site, a surgical site, an implant (e.g., knee and hip replacement, pacemaker, heart valve, or stent), a catheter, a suture, or a bone.

The medical compositions can be administered and/or applied locally or systemically. For example, the medical compositions can be applied using a swab, cloth, sponge, nonwoven wipe, paper product such as a tissue or paper towel, or the like. When applied locally, the medical composition desirably remains where it was applied. That is, the medical composition persists at the location for enough time to suppress virulence of the pathogen. In other examples, the medical composition can be administered orally or intravenously. For some infections, such as those that are initiated in the gut, the medical composition can be administered by drinking a solution or by swallowing a tablet or capsule.

For treatment of wounds and surgical sites, application of the medical composition as a coating may be desirable. Alternatively, the medical composition can be applied to a solid or porous support and then applied to the wound. Suitable supports include, for example, polymeric foams, polymeric films, and knitted or non-woven materials. The medical composition can be used for preventing and treating both acute and chronic wound infections and can be applied to any wound surface.

The medical composition can be administered and/or applied to reduce biofilm attachment on various surfaces. For example, the medical compositions can be applied to implants and catheters prior to their insertion into a mammalian body. In other examples, the medical compositions can be applied to bedding, surgical tables, tubing used in medical procedures, and other reusable medical equipment that contacts a mammal. In yet other examples, the medical compositions can be a liquid composition that is used to control or prevent biofilm populations in oral applications, such as for treating gingivitis. In still other examples, the medical compositions can be used to control or prevent biofilm populations in the middle ear that have been found in chronic otitis media. In yet other examples, the medical compositions can be used to control or prevent biofilm populations in the nose, which can result in the prevention or treatment of various infections such as those in the lungs and in blood. The medical compositions can often impact virulence factors either before or after biofilm formation.

The medical composition is suitable for preventing and treating urinary tract infections (e.g., administered in the form of a drink), ventilator associated pneumonia (e.g., administered in the form of a drink, tablet, or capsule), implant infections (e.g., administered by application as a coating on the implant), wounds (e.g., administered by application of a coating on the wound, whether chronic or acute), bloodstream infections (e.g., administered and/or applied to the blood-contacting tissue), mucosal tissue infections (e.g., administered in the nose), gastrointestinal tract (administered in the form of a coating, drink, tablet, or capsule), vaginal tissue (e.g., administered in the form of a coating), anastomotic tissue (e.g., administered as a coating on the surgical site to prevent anastomotic leaks), peritoneum (e.g., administered at the surgical site), sepsis, and the like. In some embodiments, where this is an existing microbial infection, the medical composition is applied over the area where the microbes are located.

The medical composition is usually administered in a therapeutically effective amount. This refers to the amount of the medical composition (or the amount of the phosphate-containing copolymer) that is needed to inhibit the synthesis and/or expression of one or more virulence factors by a microbe or that is enough to reduce, mitigate, or prevent a microbial infection.

Administering the medical composition suppresses at least one type of virulence factor. That is, the medical composition suppresses the formation or expression of various molecules that may be harmful to the mammal and/or suppresses the formation of biofilms on a foreign object such as an implant suture in the mammal. For example, the medical composition can suppress the formation or expression of pyocyanin, pyoverdine, collagenase (which is often measured by breakdown of gelatin as a surrogate of collagenase activity), and biofilms by bacteria.

In many embodiments of administering the medical composition, the virulence factor is reduced by at least 50 percent, at least 60 percent, at least 70 percent, at least 75 percent, at least 80 percent, at least 90 percent, at least 95 percent, at least 99 percent, at least 99.5 percent, or at least 99.9 percent when compared to the vehicle only control. The percentage can be based on weight, area, volume, or any other suitable measurable amount such as the intensity of a fluorescent or absorbance signal indicating virulence activity.

The medical composition may be suitable for treating any known microbe including, for example, bacteria, viruses, fungi such as *Candida*, and mycobacteria. In particular, administrating the medical composition can suppress virulence of at least one of gram negative *Pseudomonas aeruginosa*, gram positive *Enterococcus faecalis*, and gram positive *Staphylococcus aureus*.

Unlike some previously known methods of treating microbial infections, the medical composition does not substantially kill all microbes within the treatment area. Although some of the pathogens may be destroyed at the treatment site such as those associated with a biofilm, colonization of the protective microbes is not substantially reduced. Stated differently, the pathogens can be contained and controlled while the colonization resistance of the non-pathogenic microbes and/or the normally protective microbes can be preserved. As used in reference to reduction in the number of microbes that are present, the term "substantially" means that there is less than 1 log reduction of the microbes. In some embodiments, there may be in increase in the growth of protective microbes.

TABLE 1

Materials Used in the Examples

| Description (Abbreviation) | Source |
| --- | --- |
| Propylene Oxide (PO) - greater than 99 weight percent pure | Available from Sigma-Aldrich Co. LLC., St. Louis, MO, USA |
| Phosphorous oxychloride - 99 weight percent pure | Available from Sigma-Aldrich Co. LLC., St. Louis, MO, USA |
| Tri-iso-butylaluminum (TIBA) - 1.0M solution in hexanes | Available from Sigma-Aldrich Co. LLC., St. Louis, MO, USA |
| Triethylborane (BEt$_3$) - 1.0M solution in hexanes | Available from Sigma-Aldrich Co. LLC., St. Louis, MO, USA |
| Tetrabutylammonium bromide (TBAB) - 99 weight percent pure | Available from Alfa Aesar, Tewksbury, MA, USA |
| Pluronic L-121 (Pluronic) - number average molecular weight approximately 4400 Daltons - contained 30 weight percent polyethylene glycol (PEG) | Available from Sigma-Aldrich Co. LLC., St. Louis, MO, USA |
| Calcium hydride (CaH$_2$) - reagent grade (95 weight percent pure) | Available from Sigma-Aldrich Co. LLC., St. Louis, MO, USA |
| n-butyl lithium (n-BuLi) - 1.6M in hexanes | Available from Sigma-Aldrich Co. LLC., St. Louis, MO, USA |
| 2,8,9-Triisopropyl-2,5,8,9-tetraaza-1-phosphabicyclo[3,3,3]undecane (Verkade's Base) (CAS # 175845-21-3) | Available from Sigma-Aldrich Co. LLC., St. Louis, MO, USA |
| Toluene - anhydrous - greater than 99.8 weight percent pure | Available from Sigma-Aldrich Co. LLC., St. Louis, MO, USA |
| Tetrahydrofuran (THF) - anhydrous - greater than 99.9 weight percent pure - inhibitor-free | Available from Sigma-Aldrich Co. LLC., St. Louis, MO, USA |
| Dichloromethane (DCM) | Available under the trade designation OMNISOLV from EMD Millipore, Burlington, MA, USA |
| Isopropanol (IPA) | Available under the trade designation OMNISOLV from EMD Millipore, Burlington, MA, USA |
| Methanol | Available under the trade designation OMNISOLV (MX0480-6) from EMD Millipore, Burlington, MA, USA |
| Basic alumina - aluminum oxide that is activated and basic | Available from Sigma-Aldrich Co. LLC., St. Louis, MO, USA |
| Hydrochloric acid (HCl) | Available from EMD Millipore, Burlington, MA, USA |
| Tetrahydrofuran (THF) | Available under the trade designation OMNISOLV from EMD Millipore, Burlington, MA, USA |
| Potassium, cubes in mineral oil (K) - 40 mm × 30 mm × 20 mm, 99.5 weight percent pure with trace metals basis | Available from Sigma-Aldrich Co. LLC., St. Louis, MO, USA |
| Naphthalene | Available from Alfa Aesar, Tewksbury, MA, USA |
| Di-n-butylmagnesium (Dibutyl magnesium) - 1.0M in heptane | Available from Sigma-Aldrich Co. LLC., St. Louis, MO, USA |
| Acetic Acid | Available under the trade designation CHROMANORM from VWR International, Batavia, IL, USA |
| Benzene | Available under the trade designation OMNISOLV from EMD Millipore, Burlington MA, USA |

TABLE 1-continued

Materials Used in the Examples

| Description (Abbreviation) | Source |
| --- | --- |
| TY tryptone yeast medium (2X TY, as obtained, was diluted to 1X or to 10 weight percent TY) | Available from Sigma Life Science, St. Louis, MO, USA |
| Trypticase soy agar plates (TSA plates) | Available from Becton, Dickenson and Company, Sparks, MD, USA |
| Tryptic soy broth (TSB) | Available from General Laboratory Products, Yorksville, IL, USA |
| DQ gelatin from pig skin, fluorescein conjugate (Gelatin-fluorescein conjugate) | Available from Invitrogen, Eugene, OR, USA |
| Polypropylene Oxide (PPO 400) - number average molecular weight approximately 400 Daltons | Available from Sigma-Aldrich Co. LLC., St. Louis, MO, USA |
| Polypropylene Oxide (PPO 4000) - number average molecular weight approximately 4000 Daltons | Available from Sigma-Aldrich Co. LLC., St. Louis, MO, USA |

EXAMPLES

Media Preparations

Phosphate deficient medium (PDM) was prepared as a solution containing 0.5 mM $MgSO_4$, 0.1 mM 4-(2-Hydroxyethyl)piperazine-1-ethanesulfonic acid (HEPES) pH 7.0, 7 mM $(NH_4)_2SO_4$, 20 mM disodium succinate, 0.1 mM $KH_2PO_4$, and a trace ion mixture that contained 0.1% of 2.45 mM $CaCl_2$), 13.91 mM $ZnCl_2$, 4.69 mM $H_3BO_4$, 0.67 mM $CoCl_2$, and 1.78 mM $FeSO_4$ dissolved in water.

Defined citrate media was prepared as a solution containing 4.0 g/L sodium citrate, 1 g/L $(NH_4)_2SO_4$, and 0.2 g/L $MgSO_4 \times 7\ H_2O$, in 0.1 mM potassium phosphate buffer.

General Considerations

Reagent Preparation and Drying

Propylene oxide was stirred over $CaH_2$ overnight, degassed with three freeze-pump-thaw cycles and condensed in a flask containing n-butyllithium (solvent removed in vacuo) cooled in liquid nitrogen. Propylene oxide was then thawed in an ice water bath at 0° C. and stirred for 30 minutes before collecting the purified monomer in a flask by vacuum transfer.

Ethoxyethyl-glycidylether (EEGE) was prepared as described by Frey et. al. in *J. Am. Chem. Soc.*, 2002, 124, 9698. EEGE was purified by vacuum distillation (approximately 150 mtorr (millitorr) at 40° C.). EEGE was then dried by stirring over $CaH_2$ for 12 hours prior to filtration in a glovebox. When preparing preparatory example PE-2B, the EEGE monomer was degassed with at least three freeze-pump-thaw cycles and condensed in a flask containing dibutyl magnesium (solvent removed in vacuo) cooled in liquid nitrogen. EEGE was then thawed in an ice water bath at 0° C. and stirred for 30 minutes before collecting the purified monomer in a flask by vacuum transfer.

TBAB was dried by azeotropic distillation from benzene following by freeze-drying from the same solvent.

Pluronic was diluted with toluene to afford a 60 weight percent solution before being filtered through basic alumina to remove the stabilizer package. Pluronic was then dried under high vacuum at 60° C. until a vapor pressure less than 10 mtorr was achieved.

Toluene used as a solvent for polymerizations was purified by passing through a column based solvent purification system (available under the trade designation COMPACT SOLVENT PURIFICATION SYSTEM from Pure Process Technology, Nashua, NH, USA).

All other chemicals were used as received.

Determination of Molecular Weight by Gel Permeation Chromatography (GPC)

The GPC equipment consisted of a 1260 Infinity LC (comprised of quaternary pump, autosampler, column compartment and diode array detector) from Agilent Technologies (Santa Clara, California, United States of America) operated at a flow rate of 1.0 mL/min. The GPC column set was comprised of a PLgel MIXED-C (300 mm length×7.5 mm internal diameter) from Agilent Technologies. The detection consisted of a DAWN HELEOS II 18 angle Light Scattering detector, a VISCOSTAR viscometer and an OPTILAB T-rEX differential refractive index detector, all three from Wyatt Technology Corporation (Santa Barbara, California, United States). The molecular weight calculations were based on a calibration made using narrow dispersity polystyrene (PS) molecular weight standards ranging in molecular weight from 2.40E+06 g/mol to 580 g/mol. The calculations were performed using Agilent GPC/SEC software from Agilent Technologies.

The solvent and eluent (or mobile phase) consisted of tetrahydrofuran (stabilized with 250 parts per million of butylated hydroxytoluene) OMNISOLV grade modified (from EMD Millipore Corporation, Burlington, MA, USA).

Determination of Molecular Weight by Nuclear Magnetic Resonance (NMR)

A portion of the polymer sample was analyzed as a solution of unknown concentration (generally approximately 12 mg/mL) in $CDCl_3$. $^1$H-NMR spectra were acquired on a Bruker AVANCE 600 MHz NMR spectrometer equipped with an inverse cryoprobe. When determining molecular weight of modified or chain-extended Pluronic using $^1$H-NMR, the amount of monomer units added was calculated using the polyethylene oxide resonance as an internal standard. The increase in molecular weight due to newly incorporated PPO and EEGE was then added to the reported precursor molecular weight ($M_n$).

Calculation of Mmoles Phosphate Per Gram Copolymer

The phosphate content of the phosphate-containing copolymer is reported as mmol phosphate per gram of copolymer. The calculation is based on the molecular weight of the copolymer determined using GPC or NMR but preferably is determined using GPC. The number of phosphate repeat units (i.e., mmoles of phosphate) was determined by calculation based on the composition of the precursor copolymer used to prepare the phosphate-containing copolymer. That is, the number of mmoles phosphate is equal to the mmoles of EEGE in the initial precursor copolymer plus two (the end groups of the precursor are hydroxyl groups that can also react with phosphorous oxychloride). For EX-1A, the contribution from phosphate ester end groups was not calculated.

$$\frac{\text{mmoles phosphate}}{\text{g of copolymer}} = \frac{(\text{\# of repeat units of } EEGE \text{ in precursor copolymer}) + 2}{\text{molecular weight } (M_n) \text{ of the copolymer}}$$

Precursor Copolymer Preparations
Preparation of Random PO/EEGE Precursor Copolymers Using an Aluminum Catalyst (PE-1A to PE-1C)

A representative procedure is described as follows for precursor copolymer PE-1B. Toluene (40.0 mL), PO (15.0 mL), EEGE (5.0 mL), and TBAB (0.160 g, 0.5 mmol) were added to a 100 mL glass pressure vessel. The vessel was sealed, and the contents were stirred until a clear, colorless homogenous solution formed. Once TBAB had completely dissolved, the reaction vessel was cooled to −25° C. using a freezer. After cooling, the reaction vessel was removed from the freezer, TIBA (2.0 mL, 2.0 mmol) was rapidly added and the reaction vessel quickly sealed. A significant exotherm was observed within 5 minutes and the viscosity of the solution increased. The reaction was stirred for 12 hours.

After 12 hours, toluene was removed from the reaction via a roto-vaporizer. The viscous oil was re-dissolved in DCM (approximately 100 mL) and washed with 200 mL 1 M aqueous acetic acid using a separatory funnel. In some cases, an emulsion formed and 20 mL saturated aqueous NaCl was added to induce phase separation. The organic fraction was then collected, and the remaining aqueous phase was washed with an additional 30 mL DCM. The organic fractions were combined and dried with $MgSO_4$ prior to filtration. After drying under high vacuum, clear viscous oils were obtained. Products were analyzed by $^1$H-NMR and GPC.

PE-1B and PE-1C were prepared in a similar manner to PE-1A except different amounts of PO and EEGE were included in the initial polymerization reaction. Table 2 summarizes the amounts of each reagent used and characterization of the content and molecular weight of each PO/EEGE copolymer. In Table 2, the molecular weight ($M_n$) was measured by GPC, PI refers to the polydispersity index ($M_w/M_n$), and the term "NM" means not measured.

TABLE 2

Reagent quantities and characterization of random PO/EEGE precursor copolymers prepared using Al catalyst (PE-1A to PE-1C)

| Sample | PO (mL) | EEGE (mL) | TBAB (mg) | TBAB (mmol) | TIBA (mL) | Mass % PPO (NMR) | $M_n$ (kg/mol) | PI |
|---|---|---|---|---|---|---|---|---|
| PE-1A | 13.0 | 7.0 | 160 | 0.5 | 2.0 | 76.6 | NM | NM |
| PE-1B | 15.0 | 5.0 | 160 | 0.5 | 2.0 | 82.7 | 12.3 | 2.32 |
| PE-1C | 17.0 | 3.0 | 160 | 0.5 | 2.0 | 90.1 | 10.0 | 2.54 |

Preparation of Random PO/EEGE Precursor Copolymers Using a Boron Catalyst

A procedure like that described above for PE-1A to PE-1C was followed but with a different catalyst. A representative procedure is described as follows for PE-1D. In a glovebox, toluene (40.0 mL), PO (10.0 mL), EEGE (10.0 mL), and TBAB (160 mg) were added to a 100 mL glass pressure flask with a stirring bar. The contents of the flask were stirred until a clear, homogenous solution resulted. Once TBAB had dissolved, $BEt_3$ (2.0 mL) was added and the flask was sealed. When using $BEt_3$, an exotherm was not observed as in the case of TIBA. The reaction was stirred at room temperature for three days.

Once stirring was complete, toluene was removed from the reaction via roto-vaporizer. The viscous oil was re-dissolved in DCM (approximately 100 mL) and washed with 200 mL 1 M aqueous acetic acid using a separatory funnel. The organic fraction was then collected, and the remaining aqueous phase was washed with an additional 30 mL DCM. The organic fractions were combined and dried with $MgSO_4$ prior to filtration. After drying under high vacuum, a clear viscous oil was obtained (PE-1D). The product was analyzed by $^1$H-NMR and GPC.

PE-1E and PE-1F were prepared in a similar manner to PE-1D except different amounts of PO and EEGE were included in the initial polymerization reaction. Table 3 summarizes the amounts of each reagent used and characterization of the content and molecular weight of each PO/EEGE copolymer. In Table 3, the molecular weight ($M_n$) was measured by GPC, and PI refers to the polydispersity index ($M_w/M_n$).

TABLE 3

Reagent quantities and characterization of random PO/EEGE precursor copolymers prepared using B catalyst (PE-1D to PE-1F)

| Sample | PO (mL) | EEGE (mL) | TBAB (mg) | TBAB (mmol) | $BEt_3$ (mL) | Mass % PPO (NMR) | $M_n$ (kg/mol) | PI |
|---|---|---|---|---|---|---|---|---|
| PE-1D | 10.0 | 10.0 | 160 | 0.5 | 2.0 | 52.6 | 26.7 | 1.18 |
| PE-1E | 13.0 | 7.0 | 160 | 0.5 | 2.0 | 64.9 | 24.0 | 1.31 |
| PE-1F | 10.0 | 10.0 | 160 | 0.5 | 2.0 | 49.0 | 26.9 | 1.22 |

Preparation of Triblock Precursor Copolymers Having PEO-PPO-PEO Midblocks and Random PO/EEGE End Blocks (PE-2A and PE-2B)

Method A for PE-2A. In a glovebox, Pluronic (15.0 g, 6.8 mmol —OH) and THF (30.0 mL) were added to a glass pressure vessel with stirring bar. A solution of potassium naphthalenide (270 mg K, 940 mg naphthalene, 10 mL THF) was then added dropwise until a persistent faint green color resulted. PO (8 mL) and EEGE (23 mL) were pre-mixed before being added to the Pluronic solution. The polymerization was then sealed and heated for three days at 50° C.

After three days, toluene was removed under reduced pressure. The resulting viscous oil was then re-dissolved in DCM (approximately 100 mL) and washed with 1.0 M acetic acid (approximately 150 mL) in a separatory funnel. The organic fraction was collected, and the aqueous phase was washed with DCM (50 mL). The organic fractions were combined, dried with MgSO$_4$ and collected by filtration. Removal of DCM under reduced pressure afforded a light brown, viscous oil (PE-2A).

Method B for PE-2B. In a glovebox, Pluronic (36.9 g, 16.8 mmol —OH) and toluene (86 mL) were added to a glass pressure vessel with stirring bar. Verkade's base (2.5 g, 8.3 mmol), PO (19.2 g), and EEGE (16.8 g) were added to the Pluronic solution and stirred to incorporate. Triethylborane (25 mL) was then added and the reaction was sealed before stirring at room temperature for 93 hours.

After 93 hours, the reaction was quenched with isopropanol and the volatiles were removed under reduced pressure. The resulting viscous oil was then re-dissolved in DCM (approximately 200 mL) and washed with 1.0 M acetic acid (approximately 200 mL) in a separatory funnel. The organic fraction was collected, and the DCM was removed under reduced pressure to afford a light brown, viscous oil (PE-2B). In Table 4, M$_n$ was calculated from $^1$H-NMR.

TABLE 4

Characterization data for PE-2A and PE-2B

| Sample | PEO (mol %) | PPO (mol %) | EEGE (mol %) | M$_n$ (kg/mol) | PI |
|---|---|---|---|---|---|
| Pluronic | 19.7 | 80.3 | 0 | 4.4 | 1.51 |
| PE-2A | 12.4 | 80.6 | 7.0 | 7.9 | NM |
| PE-2B | 9.5 | 80.2 | 10.4 | 11.0 | 1.53 |

Preparation of Random PO/Glycidol Copolymer Intermediate Copolymer Used in Preparation of Phosphate-Containing Copolymers Deprotection of EEGE repeat units was completed using treatment with HCl. Generally, approximately 14-20 g of the reaction products PE-1(A-F) or PE-2(A-B) as obtained above were placed in a 250 mL flask with stir bar. Acidic methanol (approximately 150 mL, approximately 1.0 M HCl) was then added, and the solution was stirred for 12 hours at room temperature. The homogeneous solutions were then dried under reduced pressure (roto-vaporizer) until thick, viscous oils resulted. $^1$H-NMR showed complete hydrolysis of the acetal linkage as evidenced by disappearance of the characteristic methylene acetal resonance at 4.85 ppm (CDCl$_3$).

The resulting oils were suspended in approximately 300 mL benzene and dried by azeotropic distillation Once dried, the clear homogenous solutions were reduced in volume by distillation of benzene to approximately 120 mL. Except for PE-1F, an equal volume of anhydrous THF (about 120 mL) was then added. The obtained solutions were used for the following preparation of phosphate-containing copolymers. PE-1F was isolated as described below for Comparative Example 3.

Example 1: Preparation of Random Phosphate-Containing Copolymers (EX-1A to EX-1D)

A representative procedure is provided for EX-1B. A solution was prepared that contained approximately 14.0 g of copolymer PE-1B in approximately 240 ml, 1:1 THF/benzene. At room temperature, degassed phosphorous oxychloride (27.0 mL, greater than 10 times excess relative to hydroxyl groups) was added while vigorously stirring. Once addition was complete, the reaction was warmed to 50° C. and maintained at that temperature for three hours.

The reaction was then cooled to 0° C. using an ice bath and quenched with de-ionized (DI) water to hydrolyze chlorophosphine. Solvent was then removed under reduced pressure at 50° C. prior to drying on a high-vacuum line. The viscous oils were then purified by dialysis against deionized (DI) water (Repligen SPECTRA/POR BIOTECH CE cellulose acetate dialysis membranes, 31 mm flat width, molecular weight cutoff 500-1000 D). EX-1C displayed low solubility in water and was able to be purified by trituration with DI water.

Examples EX-1A, EX-1C, and EX-1D were prepared in a similar manner to EX-1B using PE-1A, PE-1C, and PE-1D respectively as the copolymers that were reacted with phosphorous oxychloride, Table 5 summarizes the amounts of phosphorous oxychloride added and the final content.

TABLE 5

Reagent quantities and characterization of phosphate-containing copolymers (EX-1A to EX-1D)

| Example | Cl$_3$P=O Added (mL) | Cl$_3$P=O Added (mmol) | Mol % PO | Equiv. Wt. (g copolymer per mol phosphate) | mmol phosphate per g copolymer |
|---|---|---|---|---|---|
| EX-1A | 37.0 | 397 | 89.2 | 631 | 1.58 |
| EX-1B | 26.0 | 279 | 92.3 | 748 | 1.34 |
| EX-1C | 10.0 | 107 | 95.8 | 1186 | 0.84 |
| EX-1D | 15.0 | 161 | 73.7 | 310 | 3.23 |

Example 2: Preparation of Cross-Linked Phosphate-Containing Copolymer (EX-2)

The previously dried PO/glycidol copolymer (PE-1E) was heated to 50° C. under an inert argon atmosphere. Phosphorous oxychloride (5.0 mL, approximately 1.1 equivalent per —OH) was then added via syringe. The reaction was heated for 12 hours over which time the viscosity increased until vitrification occurred. After 12 hours, the reaction was cooled with an ice bath prior to addition of DI water (100 mL). The gel was physically agitated and mixed before being allowed to sit at room temperature for 6 hours.

After 6 hours, the white rubbery solid was isolated by filtration. The solid product was then triturated under vigorous stirring with room temperature DI water (5×200 mL for 20 minutes each). After isolation by filtration, the white solid was dried under vacuum until an ultimate vacuum of 10 mtorr was reached.

Example 3: Preparation of a Triblock Phosphate-Containing Copolymer (EX-3A and EX-3B)

A representative example is provided for EX-3A. The previously dried THF/benzene solution consisted of 28.0 g of PE-2A copolymer in approximately 300 mL 1:1 THF/benzene. At room temperature, degassed phosphorous oxychloride (50.0 mL, >10-fold excess relative to —OH) was added while vigorously stirring. Once addition was complete, the reaction was warmed to 50° C. and maintained at that temperature for three hours. The reaction was then cooled to room temperature before being placed in a 0° C. ice bath.

Excess phosphorous oxychloride was quenched by slow addition of saturated aqueous $NaHCO_3$. Once gas evolution ceased, an additional 40 mL, DI water was added, and the contents of the flask were warmed to room temperature before being stirred for an additional 12 hours. Solvent was then removed under reduced pressure (roto-vaporizer) and the resulting viscous, light yellow oil was purified by dialysis against DI water (Repligen SPECTRA/POR BIOTECH CE cellulose acetate dialysis membranes, 31 mm flat width, molecular weight cutoff 500-1000 D). Drying afforded a light yellow, highly viscous oil.

EX-3B was prepared in a similar manner using PE-2B rather than PE-2A.

EX-3A and EX-3B had respective phosphate equivalent weights of 734 mg copolymer/mmol of phosphate (1.4 mmol phosphate/g copolymer, from PE-2A) and 585 mg copolymer/mmol of phosphate (1.7 mmol phosphate/g, from PE-2B).

Comparative Example 1: Polypropylene Glycol (PPO 400) (Comparative EX-1)

Polypropylene glycol 400, with a number average molecular weight of approximately 400 Daltons, was used as obtained from the supplier.

Comparative Example 2: Polypropylene Glycol (PPO 4000) (Comparative EX-2)

Polypropylene glycol, with a number average molecular weight of approximately 4000 Daltons, was used as obtained from the supplier.

Comparative Example 3: Comparative EX-3

The previously described benzene solution of PE-1F was freeze-dried to afford a viscous, waxy solid.

Example 4: Pyocyanin Assay

Individual growth media solutions for the assay were prepared by adding a single copolymer selected from examples EX-1A, EX-1B, EX-1C, EX-1D, EX-2, EX-3A, EX-3B and Comparative Examples 1-3 to PDM (phosphate deficient medium) and then adjusting the pH of each solution to about pH 6.0 (using 1M NaOH or 1M HCl). Solutions were sterile filtered when possible using a 0.2 micrometer filter.

An MPAO1-P2 *Pseudomonas aeruginosa* colony from a TSA plate was grown overnight in TSB media with shaking at 37° C. The overnight culture was diluted 1:50 in fresh TSB and grown with shaking at 37° C. until the OD600 (absorbance at 600 nm) reached 0.5. The culture was split into equal volumes in multiple tubes, centrifuged at 10,000 times gravity for 5 minutes, and the supernatants were removed. The resulting bacteria pellet in each tube was resuspended by adding one of the growth media solutions (about 2 mL) to the tube. A control sample was also prepared, by resuspending the bacteria pellet in a tube with PDM (2 mL) that did not contain added phosphate-containing copolymer. The sample tubes were cultured overnight with shaking at 37° C. Following the culture step, the tubes were observed by visual examination to determine if the solution in the tube had a blue color. The presence of a blue colored solution at the completion of the assay indicated secretion of pyocyanin by *Pseudomonas aeruginosa* in a test sample. The results are presented in Table 6. The abbreviation "Pi" in this and other tables refers to the phosphate group.

TABLE 6

Pyocyanin production from MPAO1-P2 *P. aeruginosa*

| Polymer Added to Growth Media (PDM) | Blue Color Observed |
| --- | --- |
| None (control) | Yes |
| EX-1A (1.6 wt. %) | No |
| EX-1B (2.1 wt. %, 28.7 mM Pi) | No |
| EX-1C (3.7 wt. %; 31.5 mM Pi) | No |
| EX-1D (0.8 wt. %; 25.5 mM Pi) | Yes (light) |
| EX-2 (1.1 wt. %; 13.4 mM Pi) | No |
| EX-3A (2.6 wt. %; 35.6 mM Pi) | No |
| EX-3B (1.5 wt. %, 25.2 mM Pi) | No |
| Comparative EX-1 (1 wt. %) | Yes |
| Comparative EX-2 (10 wt. %) | Yes (light) |
| Comparative EX-3 (0.5 wt. %) | Yes |

Example 5: Pyoverdine Assay

An MPAO1-P2 *Pseudomonas aeruginosa* colony from a TSA plate was grown overnight in 1×TY media (5 mL) with shaking at 37° C.

Individual growth media solutions for the assay were freshly prepared by adding a single copolymer selected from Examples 1A, 1B, 1C, 1D, 2, 3A, 3B, and Comparative Examples 1 and 3, or a combination of copolymers selected from Examples 1B, 1C, and 3B to 10% TY media and then adjusting the pH of each solution to about pH 6.0 (using 1M NaOH or 1M HCl). The solutions were sterile filtered when possible using a 0.2 micrometer filter.

Each growth media solution (200 microliters) was added to a separate well of a 96-well black, clear-bottom plate. Samples were prepared in triplicate (n=3). MPAO1-P2 bacteria were centrifuged and resuspended in 5 mL of 10% TY media and 3 microliters of resuspended bacteria were added to each well. Background control wells were also prepared that did not have bacteria added to the wells. Pyoverdine production (fluorescent intensity at 360 nm excitation/460 nm emission) and bacteria growth (OD600; i.e., absorbance at 600 nm) were measured kinetically using a plate reader (Synergy HTX Plate Reader, Biotek Instruments, Winooski, VT) with shaking at 37° C. The background values were subtracted from the respective fluorescence and absorbance measurements. The pyoverdine fluorescence values (RFU, relative fluorescence units) were then normalized for bacteria growth by dividing the RFU value by the OD600 measurement. In Tables 7-8, data is shown at the 21 hour time point. In Tables 9-10, data is shown at the 20 hour time point. In Tables 11-12, data is shown at the 12 hour time point. Compared to the control samples, the test samples with added phosphate-containing copolymer did not substantially reduce bacterial growth (Tables 8, 10, 12).

TABLE 7

Pyoverdine production/bacteria growth at 21 hours (MPAO1-P2 *P. aeruginosa*)

| Polymer Added to Growth Media (10% TY Media) | Pyoverdine Production (RFU/OD600) (21 hours) Mean ± Standard Deviation (n = 3) |
|---|---|
| None (control) | 141 ± 5 |
| EX-1A (1.6 wt. %)* | 20 ± 5 |
| EX-1B (2.1 wt. %; 28.7 mM Pi)* | 19 ± 7 |
| EX-1D (0.8 wt. %; 25.5 mM Pi)* | 22 ± 4 |
| EX-3A (2.6 wt. %; 35.6 mM Pi)* | 22 ± 9 |

*P2 bacteria grown in these conditions had significantly less pyoverdine production than the 10% TY media control ($p < 0.0001$).

TABLE 8

Bacteria growth (OD600) at 21 hours (MPAO1-P2 *P. aeruginosa*)

| Polymer Added to Growth Media (10% TY Media) | Bacteria Growth (OD600) (21 hours) Mean ± Standard Deviation (n = 3) |
|---|---|
| 10% TY | 0.130 ± 0.008 |
| EX-1A (1.6 wt. %) | 0.119 ± 0.003 |
| EX-1B (2.1 wt. %; 28.7 mM Pi) | 0.158 ± 0.006 |
| EX-1D (0.8 wt. %; 25.5 mM Pi) | 0.150 ± 0.005 |
| EX-3A (2.6 wt. %; 35.6 mM Pi) | 0.176 ± 0.006 |

TABLE 9

Pyoverdine production/bacteria density at 20 hours (MPAO1-P2 *P. aeruginosa*)

| Polymer Added to Growth Media (10% TY Media) | Pyoverdine Production (RFU/OD600) (20 hours) Mean ± Standard Deviation (n = 3) |
|---|---|
| None (control) | 86 ± 7 |
| EX-1C (3.7 wt. %; 31.5 mM Pi) | 238 ± 6 |
| EX-2 (1.1 wt. %; 13.4 mM Pi)* | 55 ± 10 |
| EX-3A (2.6 wt. %; 35.6 mM Pi)* | 34 ± 1 |
| EX-3B (1.5 wt. %, 25.2 mM Pi)* | 28 ± 6 |
| Comparative EX-1 (1 wt. %) | 101 ± 9 |
| Comparative EX-3 (0.5 wt. %) | 88 ± 8 |

*P2 bacteria grown in these conditions had significantly less pyoverdine production than the 10% TY media control ($p ≤ 0.0001$).

TABLE 10

Bacteria growth (OD600) at 20 hours (MPAO1-P2 *P. aeruginosa*)

| Polymer Added to Growth Media (10% TY Media) | Bacteria Growth (OD600) (20 hours) Mean ± Standard Deviation (n = 3) |
|---|---|
| None (control) | 0.14 ± 0.01 |
| EX-1C (3.7 wt. %; 31.5 mM Pi) | 0.134 ± 0.003 |
| EX-2 (1.1 wt. %; 13.4 mM Pi) | 0.19 ± 0.01 |
| EX-3A (2.6 wt. %; 35.6 mM Pi) | 0.207 ± 0.007 |
| EX-3B (1.5 wt. %, 25.2 mM Pi) | 0.176 ± 0.005 |
| Comparative EX-1 (1 wt. %) | 0.154 ± 0.003 |
| Comparative EX-3 (0.5 wt. %) | 0.14 ± 0.02 |

TABLE 11

Pyoverdine production/bacteria density at 12 hours (MPAO1-P2 *P. aeruginosa*)

| Polymer Added to Growth Media (10% TY Media) | Pyoverdine Production (RFU/OD600) (12 hours) Mean ± Standard Deviation (n = 3) |
|---|---|
| None (control) | 87 ± 7 |
| EX-1B (2.1 wt. %; 28.7 mM Pi)* | 10.7 ± 0.2 |
| EX-1C (3.7 wt. %; 31.5 mM Pi) | 179 ± 9 |
| EX-3B (1.5 wt. %; 25.2 mM Pi)* | 11 ± 4 |
| EX-1B (1.1 wt. %; 14.3 mM Pi) + EX-1C (1.9 wt. %; 15.7 mM Pi)* | 38 ± 1 |
| EX-1C (1.9 wt. %; 15.7 mM Pi) + EX-3B (0.7 wt. %; 12.6 mM Pi)* | 16 ± 2 |

*P2 bacteria grown in these conditions had significantly less pyoverdine production than the 10% TY media control ($p ≤ 0.0001$).

TABLE 12

Bacteria growth (OD600) at 12 hours (MPAO1-P2 *P. aeruginosa*)

| Polymer Added to Growth Media (10% TY Media) | Bacteria Growth (OD600) (12 hours) Mean ± Standard Deviation (n = 3) |
|---|---|
| None (control) | 0.117 ± 0.006 |
| EX-1B (2.1 wt. %; 28.7 mM Pi) | 0.186 ± 0.005 |
| EX-1C (3.7 wt. %; 31.5 mM Pi) | 0.160 ± 0.003 |
| EX-3B (1.5 wt. %, 25.2 mM Pi) | 0.1563 ± 0.0006 |
| EX-1B (1.1 wt. %; 14.3 mM Pi) + EX-1C (1.9 wt. %; 15.7 mM Pi) | 0.155 ± 0.004 |
| EX-1C (1.9 wt. %; 15.7 mM Pi) + EX-3B (0.7 wt. %; 12.6 mM Pi) | 0.16 ± 0.01 |

Example 6: Collagenase Assay Using Gelatin Breakdown as a Surrogate

Breakdown of tissue proteins has been observed in many bacterial infections and is attributed to bacterial collagenase activity. Gelatin breakdown was used as a surrogate for collagen breakdown in the assay. A fluorescently labeled gelatin (DQ gelatin-fluorescein conjugate) was used to monitor gelatin breakdown with the fluorescence signal increasing with increased gelatin degradation.

An MPAO1-P2 *Pseudomonas aeruginosa* colony and an *Enterococcus faecalis* (V583) colony were each obtained from a corresponding TSA plate and separately grown overnight in 1×TY media (5 mL) with shaking at 37° C. Next, each culture was centrifuged at 3000 times gravity for 5 minutes and the supernatant was removed. The bacteria were washed two times with water.

For assays using MPAO1-P2 *Pseudomonas aeruginosa*, individual growth media solutions for the assay were freshly prepared by adding a single copolymer selected from Examples 1A, 1B, 1C, 1D, and 3A to 10% TY media and then adjusting the pH of each solution to about pH 6.0 (using 1M NaOH or 1M HCl). For assays using *Enterococcus faecalis* (V583), individual growth media solutions for the assay were freshly prepared by adding a single copolymer selected from Examples 1C and 3B to 1×TY media and then adjusting the pH of each solution to about pH 6.0 (using 1M NaOH or 1M HCl). All the growth media solutions were sterile filtered when possible using a 0.2 micrometer filter.

An aliquot of each growth media solution (200 microliters) was added to the well of a 96-well black, clear-bottom plate. Samples were prepared in triplicate (n=3). Reconstituted gelatin-fluorescein (20 microliters of 1 mg/mL) was then added to each well. The bacteria samples were resuspended in 5 mL of 10% TY media. A 3 microliter sample of either resuspended MPAO1-P2 *Pseudomonas aeruginosa* or *Enterococcus faecalis* (V583) was added to each well. Background control wells were also prepared that did not have bacteria added to the wells. Bacterial growth was measured at 600 nm (OD600) and collagenase activity was measured as fluorescent intensity at 485 nm excitation/528 nm emission. Collagenase activity (RFU) was normalized to bacterial growth (OD600) for each well. For MPAO1-P2 *Pseudomonas aeruginosa*, the time required to maximum fluorescence (i.e., time to inflection point) was measured. For *Enterococcus faecalis*, the collagenase activity was measured at the 22 hour time point. Compared to the control samples, the test samples with added phosphate-containing copolymer did not substantially reduce bacterial growth.

TABLE 13

Time to the proteolytic activity inflection point (MPAO1-P2 *P. aeruginosa*)

| Polymer Added to Growth Media (10% TY Media) | Time to Proteolytic Activity Inflection point (hours) Mean ± Standard Deviation (n =3) |
|---|---|
| None (control) | 11.5 ± 0.1 |
| EX-1C (3.7 wt. %; 31.5 mM Pi)* | Did not reach inflection point by 22 hours (end of experiment) |

*P2 bacteria grown in this condition took a significantly longer time to reach the proteolytic activity inflection point than the 10% TY media control (p ≤ 0.0001).

TABLE 14

Time to the proteolytic activity inflection point (MPAO1-P2 *P. aeruginosa*)

| Polymer Added to Growth Media (10% TY Media) | Time to Proteolytic Activity Inflection point (hours) Mean ± Standard Deviation (n = 3) |
|---|---|
| None (control) | 15.9 ± 0.4 |
| EX-1A (1.6 wt. %) | 14.6 ± 3.8 |
| EX-1B (2.1 wt. %; 28.7 mM Pi) | 18.2 ± 5.3 (2/3 replicates did not reach inflection point by 21.3 hours; averaged 12.05 with 21.3 and 21.3) |
| EX-1D (0.8 wt. %; 25.5 mM Pi) | 14.4 ± 1.7 |
| EX-3A (2.6 wt. %; 35.6 mM Pi) | 15.6 ± 6.4 |

TABLE 15

Collagenase Production/Bacteria Growth at 22 hours (*Enterococcus faecalis* V583)

| Polymer Added to Growth Media (1X TY Media) | Collagenase Production (RFU/OD600) (22 hours) Mean ± Standard Deviation (n = 3) |
|---|---|
| None (control) | 2447 ± 734 |
| EX-1C (3.7 wt. %; 31.5 mM Pi)* | 27 ± 35 |
| EX-3B (1.5 wt. %; 25.2 mM Pi)* | 971 ± 82 |

**Enterococcus faecalis* bacteria grown in these conditions had significantly less collagenase production than the 1X TY media control (p ≤ 0.01).

Example 7: Biofilm Formation Assay Using Crystal Violet Staining

An MPAO1-P2 *Pseudomonas aeruginosa* colony from a TSA plate was grown overnight in 1×TY media (5 mL) with shaking at 37° C. Next, the bacteria were centrifuged at 3000 times gravity for 5 minutes and the supernatant was removed. The bacteria were washed once with water or 10% TY media.

Individual growth media solutions for the assay were freshly prepared by adding a single copolymer selected from Examples 1A, 1B, 1C, 1D, 3A, 3B and Comparative Examples 1-3 to 10% TY media and then adjusting the pH of each solution to about pH 6.0 (using 1M NaOH or 1M HCl). Each growth media solution (200 microliters) was added to a separate well of a 96-well black, clear-bottom plate. Samples were prepared in triplicate (n=3). MPAO1-P2 bacteria were resuspended in 5 mL of 10% TY and 3 microliters of resuspended bacteria were added to each well. Background control wells were also prepared that did not have bacteria added to the wells. The 96-well plate was incubated at 37° C. with shaking for 21 hours using a plate reader to kinetically measure growth (OD600).

The solutions were aspirated from wells. Each well was washed two times with water (200 microliters per well) and then stained with 200 microliters of 0.1% aqueous crystal violet solution for 5 to 10 minutes. The crystal violet solution was then aspirated from each well and the wells were washed four times with water (200 microliters per wash per well). The remaining crystal violet stain in each well was solubilized with 200 microliters ethyl alcohol and then transferred to a well in a fresh 96-well plate. The absorbance of each well was measured at 550 nm and normalized to growth (background-subtracted OD600 measured at the 21 hour point of the kinetic growth measurements). The results are reported in Tables 16 and 17. Compared to the control samples, the test samples with added phosphate-containing copolymer did not substantially reduce bacterial growth.

TABLE 16

Biofilm results

| Polymer Added to Growth Media (10% TY Media) | Absorbance at 550 nm (from crystal violet stain) normalized to growth (OD600) at 21 hours Mean ± Standard Deviation (n = 3) |
|---|---|
| None (control) | 1.7 ± 0.4 |
| EX-1A (1.6 wt. %)* | 0.67 ± 0.04 |
| EX-1B (2.1 wt. %; 28.7 mM Pi)* | 0.50 ± 0.2 |
| EX-1D (0.8 wt. %; 25.5 mM Pi) | 1.5 ± 0.7 |
| EX-3A (2.6 wt. %; 35.6 mM Pi)* | 0.24 ± 0.08 |

*P2 bacteria grown in these conditions had significantly less crystal violet staining (normalized to growth) than the 10% TY media control (p < 0.05).

TABLE 17

Biofilm Results

| Polymer Added to Growth Media (10% TY Media) | Absorbance at 550 nm (from crystal violet stain) normalized to growth (OD600) at 21 hours Mean ± Standard Deviation (n = 3) |
|---|---|
| None (control) | 2.0 ± 0.5 |
| EX-1C (3.7 wt. %; 31.5 mM Pi)* | 0.34 ± 0.03 |
| EX-3B (1.5 wt. %; 25.2 mM Pi)* | 0.4 ± 0.1 |
| Comparative EX-1 (1 wt. %) | 1.5 ± 0.1 |
| Comparative EX-2 (10 wt. %)* | 0.9 ± 0.2 |
| Comparative EX-3 (0.5 wt. %) | 1.5 ± 0.2 |

*P2 bacteria grown in these conditions had significantly less crystal violet staining (normalized to growth) than the 10% TY media control (p ≤ 0.0002).

What is claimed is:

1. A phosphate-containing copolymer comprising a first copolymeric unit comprising:
   (a) monomeric units of Formula (I) and (I)

(b) monomeric units of Formula (II) or a salt thereof and (II)

(c) optional monomeric units of Formula (III)

(III)

wherein
   $R^1$ is hydrogen, alkyl, aryl, alkaryl, or aralkyl;
   x is mole percent monomeric units of Formula (I) based on total moles of monomeric units in the first copolymeric unit;
   y is mole percent monomeric units of Formula (II) based on total moles of monomeric units in the first copolymeric unit;
   z is mole percent monomeric units of Formula (III) based on total moles of monomeric units in the first copolymeric unit;
   (x+y+2z) is at least 90 mole percent based on total moles of monomeric units in the first copolymeric unit;
   $100[(y+2z) \div (x+y+2z)]$ is in a range of 3.5 to 30 percent; and
   each asterisk (*) denotes a connection site to another monomeric unit or to a terminal group.

2. The phosphate-containing copolymer of claim 1, wherein $100[(y+2z) \div (x+y+2z)]$ is in a range of 5 to 30 mole percent based on total moles of monomeric units in the first copolymeric unit.

3. The phosphate-containing copolymer of claim 1, wherein the phosphate-containing copolymer is a random copolymer comprising a single first copolymeric unit.

4. The phosphate-containing copolymer of claim 1, wherein the phosphate-containing copolymer is a block copolymer comprising at least one block that comprises the first copolymeric unit and at least one second block that is free of phosphate groups and that comprises poly(ethylene oxide), poly(propylene oxide), or a combination thereof.

5. The phosphate-containing copolymer of claim 4, wherein the phosphate-containing copolymer is a triblock copolymer comprising (a) two endblocks that are each the first copolymeric unit and (b) a midblock that is free of phosphate groups and that comprises poly(ethylene oxide), poly(propylene oxide), or a combination thereof.

6. The phosphate-containing copolymer of claim 5, wherein the midblock is of Formula (IV)

$$*-(CH_2CH_2O)_n-(CH_2CH(CH_3)O)_q-(CH_2CH_2O)_m-*$$ (IV)

wherein
   n, q, and m are each an integer that is at least 1; and
   each asterisk (*) denotes a connection site to another monomeric unit or to a terminal group.

7. The phosphate-containing copolymer of claim 5, wherein the phosphate-containing copolymer comprises 20 to 70 weight percent midblock based on a total weight of the copolymer.

8. The phosphate-containing copolymer of claim 1, wherein the phosphate-containing copolymer contains 0.8 to 6.5 mmoles of phosphate per gram of the phosphate-containing copolymer.

9. The phosphate-containing copolymer of claim 8, wherein the phosphate-containing copolymer contains 1 to 3.5 mmoles of phosphate per gram of the phosphate-containing copolymer.

10. The phosphate-containing copolymer of claim 1, wherein the phosphate-containing copolymer has a number average molecular weight in a range of 6,000 to 80,000 Daltons.

11. The phosphate-containing copolymer of claim 10, wherein the number average molecular weight is in a range of 20,000 to 40,000 Daltons.

12. The phosphate-containing copolymer of claim 1, wherein the phosphate-containing copolymer has a solubility in water that is no greater than 200 milligrams per mL at 30 degrees Celsius.

13. A medical composition comprising a phosphate-containing copolymer, wherein the medical composition is suitable for administration to a mammal and wherein the phosphate-containing copolymer comprises a first copolymeric unit comprising:
   (a) monomeric units of Formula (I) and (I)

(b) monomeric units of Formula (II) or a salt thereof and (II)

(c) optional monomeric units of Formula (III)

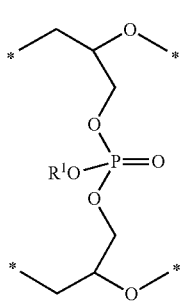

(III)

wherein
$R^1$ is hydrogen, alkyl, aryl, alkaryl, or aralkyl;
x is mole percent monomeric units of Formula (I) based on total moles of monomeric units in the first copolymeric unit;
y is mole percent monomeric units of Formula (II) based on total moles of monomeric units in the first copolymeric unit;
z is mole percent monomeric units of Formula (III) based on total moles of monomeric units in the first copolymeric unit;
(x+y+2z) is at least 90 mole percent based on total moles of monomeric units in the first copolymeric unit;
$100[(y+2z) \div (x+y+2z)]$ is in a range of 3.5 to 30 percent; and
each asterisk (*) denotes a connection site to another monomeric unit or to a terminal group.

14. The medical composition of claim 13, wherein the medical composition prevents, mitigates, or treats a microbial infection.

15. The medical composition of claim 13, wherein the medical composition is a spray, gel, coating, tablet, or capsule.

16. A method of suppressing microbial virulence, the method comprising administering and/or applying a medical composition, the medical composition comprising a phosphate-containing copolymer, the phosphate-containing copolymer comprising a first copolymeric unit comprising:
(a) monomeric units of Formula (I) and

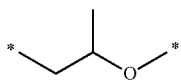

(I)

(b) monomeric units of Formula (II) or a salt thereof and

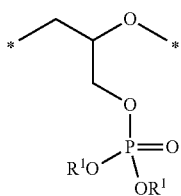

(II)

(c) optional monomeric units of Formula (III)

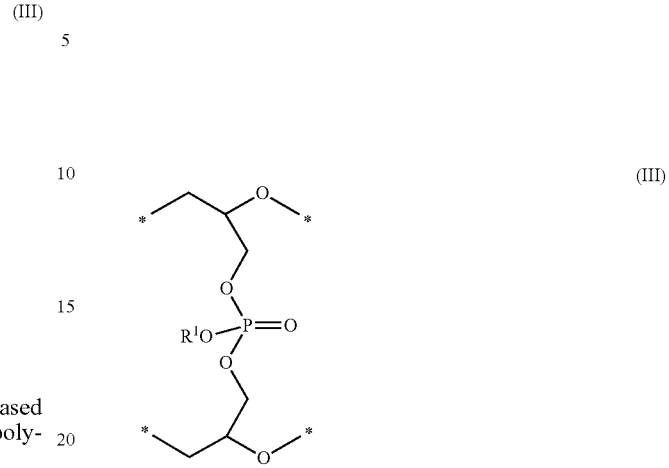

(III)

wherein
$R^1$ is hydrogen, alkyl, aryl, alkaryl, or aralkyl;
x is mole percent monomeric units of Formula (I) based on total moles of monomeric units in the first copolymeric unit;
y is mole percent monomeric units of Formula (II) based on total moles of monomeric units in the first copolymeric unit;
z is mole percent monomeric units of Formula (III) based on total moles of monomeric units in the first copolymeric unit;
(x+y+2z) is at least 90 mole percent based on total moles of monomeric units in the first copolymeric unit;
$100[(y+2z) \div (x+y+2z)]$ is in a range of 3.5 to 30 percent; and
each asterisk (*) denotes a connection site to another monomeric unit or to a terminal group.

17. The method of claim 16, wherein administering and/or applying the medical composition suppresses at least one type of virulence factor selected from pyocyanin, pyoverdine, collagenase, or biofilm.

18. The method of claim 16, wherein administering and/or applying the medical composition prevents, mitigates, or treats a microbial infection but does not prevent growth of microbes.

19. The method of claim 16, wherein administrating and/or applying the medical composition comprises applying the medical composition to skin, mucosa, internal tissue, wound site, surgical site, implant, or bone.

20. The method of claim 16, wherein administrating and/or applying the medical composition reduces or inhibits virulence of gram negative *Pseudomonas aeruginosa*, gram positive *Enterococcus faecalis*, or gram positive *Staphylococcus aureus*.

* * * * *